Jan. 28, 1930.  O. S. LUNDGREN  1,744,777
CAP SUPPORTED LAMP
Filed April 24, 1928
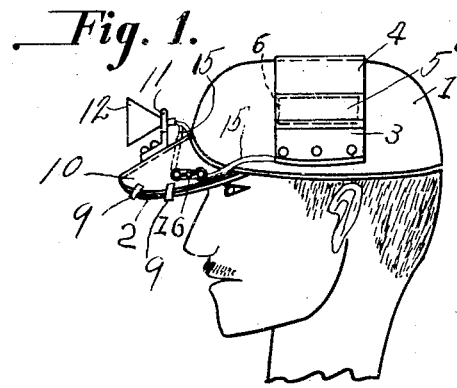
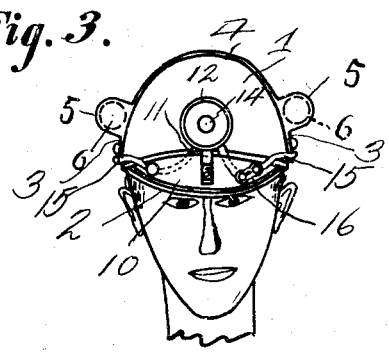
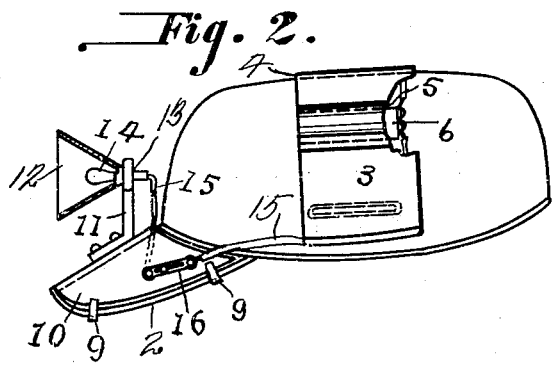
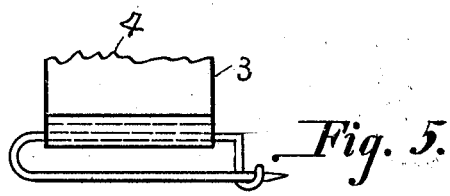
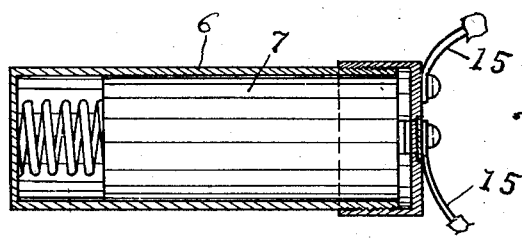
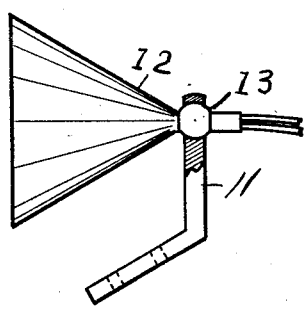
INVENTOR.
O. S. Lundgren
BY
ATTORNEY.

Patented Jan. 28, 1930

1,744,777

UNITED STATES PATENT OFFICE

OTTO S. LUNDGREN, OF FORT CROOK, NEBRASKA

CAP-SUPPORTED LAMP

Application filed April 24, 1928. Serial No. 272,511.

The invention relates to cap supported lamps particularly adapted for use by mechanics and others in correcting automobile troubles, and has for its object to provide a device of this character which may be used by any one in various kinds of work, and particularly when working in positions where the space is restricted and it is necessary to use both hands for manipulating tools, for instance by electricians in wiring houses and by plumbers.

A further object is to provide a flexible plate to which the lamp bracket is attached, and which plate is flexed to conform to the curvature of a cap brim whereby it may be secured to the cap brim by the use of U-shaped clips around the marginal edge of the cap brim.

A further object is to provide a flexible member arching the crown of the cap and anchored at opposite sides thereof and provided with pockets for the reception of batteries having conductor wires connected to the lamp, and a circuit maker and breaker on the flexible base within easy reach of the operator whereby the circuit may be closed or opened as desired.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the cap.

Figure 2 is an enlarged side elevation of the cap showing the lamp reflector in vertical longitudinal section.

Figure 3 is a front elevation of the cap.

Figure 4 is an enlarged longitudinal sectional view through the battery casing.

Figure 5 is an enlarged plan view of one end of the battery carrying member showing the fastening means.

Figure 6 is a detail view showing the ball and socket support for the lamp.

Figure 7 is a perspective view of one of the clips.

Referring to the drawing, the numeral 1 designates the crown of the hat and 2 the brim thereof. The hat is preferably of the cap type. Secured to opposite sides of the cap 1 are the ends 3 of a flexible member 4, which flexible member may be formed from any material, for instance cloth or leather and it arches the crown of the hat and is provided with pockets 5 for the reception of battery casings 6, in which are disposed batteries 7 for supplying electric energy to the lamp hereinafter set forth.

Secured to the visor 8 of the cap by means of U-shaped clips 9 is a flexible sheet 10 formed from leather, metal or any other suitable material that will flex, and which sheet of material conforms to the shape of the visor 8, whereby when the U-shaped clips 9 are placed over the registering edges of the visor and member 10, said flexible member 10 will be securely clamped on the visor. Extending upwardly from the flexible member 10 substantially centrally thereof is a bracket 11, which supports the lamp reflector 12 in a universal joint 13, whereby said lamp may be adjusted and frictionally held in various positions, for directing light rays on work being performed. Disposed within the reflector 12 is an electric bulb 14 which is in circuit with the batteries 7 through the conductor wires 15 and the flexible member 10 has mounted thereon a conventional form of circuit maker and breaker 16 in circuit with the batteries 7 and the conductors 15, therefore it will be seen that the operator may easily and quickly turn on or off the light as desired.

From the above it will be seen that a portable lamp is provided particularly adapted for use in connection with caps, and provided with means whereby the same may be easily and quickly attached to the cap without varying the construction thereof, and it will also be noted that when the cap wears or is discarded, the device may be easily and quickly removed therefrom and attached to another cap. By making the member 10 flexible it is obvious it may be bent to conform to the curvature of visors having different curvature, and by making the member 4 of flexible material, it will conform to the shape of the head of the wearer and various crowns of hats.

The invention having been set forth what is claimed as new and useful is:

The combination with a cap having a crown and a visor, of a portable light, said portable light comprising a flexible base conforming in shape to the visor and flexed into engagement therewith, clips holding the base in flexed position on the visor, a lamp bracket carried by said base, a lamp universally supported in said bracket, a flexible member arching the crown and attached to opposite sides thereof, batteries disposed in said flexible members, said batteries being in circuit with the lamp, and a circuit maker and breaker carried by the base and in said circuit.

In testimony whereof I hereunto affix my signature.

OTTO S. LUNDGREN.